United States Patent
Tajiri

(10) Patent No.: US 11,178,366 B2
(45) Date of Patent: Nov. 16, 2021

(54) PROJECTOR

(71) Applicant: SONY CORPORATION, Tokyo (JP)

(72) Inventor: Shinichiro Tajiri, Kanagawa (JP)

(73) Assignee: Sony Corporation

(*) Notice: Subject to any disclaimer, the term of this patent is extended or adjusted under 35 U.S.C. 154(b) by 0 days.

(21) Appl. No.: 16/760,124

(22) PCT Filed: Oct. 15, 2018

(86) PCT No.: PCT/JP2018/038266
§ 371 (c)(1),
(2) Date: Apr. 29, 2020

(87) PCT Pub. No.: WO2019/087751
PCT Pub. Date: May 9, 2019

(65) Prior Publication Data
US 2020/0329219 A1 Oct. 15, 2020

(30) Foreign Application Priority Data
Nov. 6, 2017 (JP) .............................. JP2017-214114

(51) Int. Cl.
*H04N 9/31* (2006.01)
*G02B 26/08* (2006.01)
*G02B 27/48* (2006.01)

(52) U.S. Cl.
CPC ......... *H04N 9/315* (2013.01); *G02B 26/0833* (2013.01); *G02B 27/48* (2013.01); *H04N 9/3108* (2013.01)

(58) Field of Classification Search
CPC .. H04N 9/3161; H04N 9/3164; H04N 9/3102; H04N 9/3141; H04N 9/3129;
(Continued)

(56) References Cited

U.S. PATENT DOCUMENTS 7,165,845 B2 * 1/2007 Takeda .................. G03B 33/06
348/771
2007/0097486 A1 5/2007 Yang et al.
(Continued)

FOREIGN PATENT DOCUMENTS

JP 2009-514031 4/2009
JP 2012-133284 7/2012
(Continued)

OTHER PUBLICATIONS

International Search Report prepared by the Japan Patent Office dated Dec. 25, 2018, for International Application No. PCT/JP2018/038266.

*Primary Examiner* — Sherrie Hsia
(74) *Attorney, Agent, or Firm* — Sheridan Ross, PC

(57) ABSTRACT

A projector of the present disclosure includes a light source section, a projection optical system, a mirror array, and a tilt angle controller. The light source section emits light as source of illumination light. The projection optical system projects an image onto a projection surface using the illumination light. The mirror array device includes a plurality of mirrors. The mirror array varies a tilt angle of each of the mirrors to deflect the illumination light toward the projection optical system, and generates the image from the illumination light. The tilt angle controller performs switching control on the tilt angle of each of the mirrors in a case of deflecting the entering light toward the projection optical system. The switching control is control of switching the tilt angle between a reference tilt angle and one or a plurality of non-reference tilt angles different from the reference tilt angle.

19 Claims, 15 Drawing Sheets

(58) Field of Classification Search
CPC .... H04N 9/315; H04N 9/3108; H04N 9/3197; H04N 9/31; G02B 26/0833; G02B 26/0825; G02B 27/48
USPC ....... 348/744, 759, 764, 760, 770, 771, 782; 359/291; 353/31, 33, 81, 82, 94, 97–99
See application file for complete search history.

(56) References Cited

U.S. PATENT DOCUMENTS

| | | | |
|---|---|---|---|
| 2008/0074725 A1* | 3/2008 | Pan | B81B 3/0005 359/291 |
| 2008/0074729 A1* | 3/2008 | Ishii | G02B 26/0833 359/295 |
| 2008/0158437 A1* | 7/2008 | Arai | G09G 3/2029 348/742 |
| 2009/0034043 A1 | 2/2009 | Kaeriyama et al. | |
| 2012/0162615 A1 | 6/2012 | Sawai | |
| 2016/0033757 A1 | 2/2016 | Kurtz et al. | |

FOREIGN PATENT DOCUMENTS

| | | |
|---|---|---|
| JP | 2013-025130 | 2/2013 |
| JP | 2013-228426 | 11/2013 |
| JP | 2016-099390 | 5/2016 |
| JP | 2016-517029 | 6/2016 |

\* cited by examiner

TILT ANGLE: REFERENCE TILT ANGLE

ENTRANCE PUPIL OF PROJECTION OPTICAL SYSTEM

TILT ANGLE: NON-REFERENCE TILT ANGLE

ENTRANCE PUPIL OF PROJECTION OPTICAL SYSTEM

TILT ANGLE: A PLURALITY OF NON-REFERENCE TILT ANGLES

COMPARATIVE EXAMPLE

TILT ANGLE: REFERENCE TILT ANGLE

TILT ANGLE: −α (NON-REFERENCE TILT ANGLE)

TILT ANGLE: NON-REFERENCE TILT ANGLE

ENTRANCE PUPIL OF PROJECTION OPTICAL SYSTEM

PROJECTOR

CROSS REFERENCE TO RELATED APPLICATIONS

This application is a national stage application under 35 U.S.C. 371 and claims the benefit of PCT Application No. PCT/JP2018/038266 having an international filing date of 15 Oct. 2018, which designated the United States, which PCT application claimed the benefit of Japanese Patent Application No. 2017-214114 filed 6 Nov. 2017, the entire disclosures of each of which are incorporated herein by reference.

TECHNICAL FIELD

The present disclosure relates to a projector that projects a projection image that is generated on the basis of illumination light.

BACKGROUND ART

A projector that generates a projection image by irradiating a spatial optical modulator with illumination light is known (see PTLs 1 to 3).

CITATION LIST

Patent Literature

PTL 1: Japanese Unexamined Patent Application Publication No. 2009-216843
PTL 2: Japanese Unexamined Patent Application Publication No. 2003-98476
PTL 3: Japanese Unexamined Patent Application Publication (Translation of PCT Application) No. 2012-527646

SUMMARY OF THE INVENTION

In a case of using a laser light source as a light source of illumination light, a projector described above easily causes speckle.

It is desirable to provide a projector that makes it possible to achieve speckle reduction while suppressing an increase in configuration size.

A projector according to an embodiment of the present disclosure includes a light source section, a projection optical system, a mirror array device, and a tilt angle controller. The light source section emits light that is to be a source of illumination light. The projection optical system projects a projection image onto a projection surface. The projection image is generated on the basis of the illumination light. The mirror array device includes a plurality of mirrors that, the illumination light is to enter. The mirror array device varies a tilt angle of each of the mirrors on the basis of an image signal to deflect the illumination light toward the projection optical system, and generates the projection image from the illumination light. The tilt angle controller performs switching control, on the basis of the image signal within a predetermined period, on the tilt angle of each of the mirrors in a case of deflecting the entering light toward the projection optical system. The switching control is control of switching the tilt angle between a reference tilt angle and one or a plurality of non-reference tilt angles different from the reference tilt angle.

In the projector according to an embodiment of the present disclosure, switching control is performed, on the basis of the image signal within a predetermined period, on the tilt angle of each of the mirrors in the case of deflecting the entering light toward the projection optical system. The switching control is the control of switching the tilt angle between the reference tilt angle and the one or the plurality of non-reference tilt angles different from the reference tilt angle.

According to the projector according to an embodiment of the present disclosure, switching control is performed, on the basis of the image signal within a predetermined period, on the tilt angle of each of the mirrors in the case of deflecting the entering light toward the projection optical system. The switching control is the control of switching the tilt angle between the reference tilt angle and the one or the plurality of non-reference tilt angles different from the reference tilt angle. It is therefore possible to achieve speckle reduction while suppressing an increase in configuration size.

It is to be noted that effects described here are not necessarily limitative, and any of the effects described in the present disclosure may be provided.

MODES FOR CARRYING OUT THE INVENTION

Figure 1:
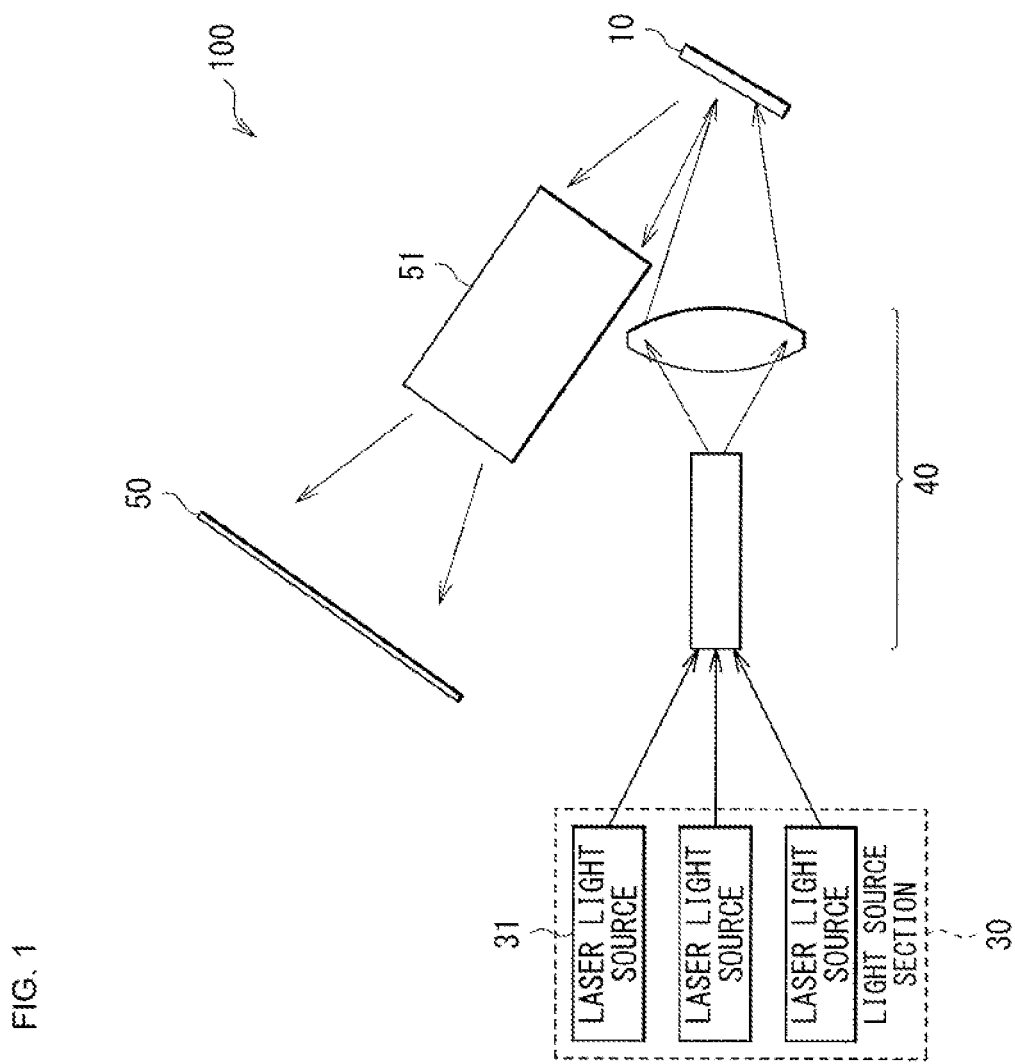
FIG. 1 is a configuration diagram that illustrates an overview of an optical system in a projector according to a first embodiment of the present disclosure.

In the following, embodiments of the present disclosure are described in detail with reference to drawings. It is to be noted that the description is given in the following order.
1. First Embodiment
  1.1 Overview of Optical System in Projector (FIG. 1)
  1.2 Overview of Control System in Projector (FIG. 2)
  1.3 Configuration Example of Mirror Array Device (FIGS. 3 to 12)
  1.4 Description of Tilt Angle of Mirror and Light-ray-capturing Angle of Projection Optical System (FIGS. 13 to 15)
  1.5 Distribution State of Light Rays for Each Wavelength (FIG. 16)
  1.6 Example of Gray-scale Bit Configuration in One Frame (FIGS. 17 and 18)
  1.7 Effects
2. Other Embodiments

1. First Embodiment

In a projector that uses laser as a light source, there is an issue of what is referred to as speckle, a deterioration in image quality derived from laser coherence. For example, for a type of a projector that generates a projection image by illuminating a spatial optical modulator with laser, there are mainly two methods of reducing speckle. A first method is to convert a laser wavelength into a multi-wavelength, thereby reducing speckle. A second method is to temporally vary a state of laser coherence, thereby reducing speckle by time average.

In the foregoing first method, it is necessary to incorporate a laser device having a plurality of wavelengths as a light source, which makes it difficult to achieve a reduction in size and cost of the light source. In the foregoing second method, while it is possible to configure the light source with a single laser device, it is necessary to include an optical element and a drive component that temporally vary a coherence state, and an optical system, which makes it difficult to achieve a reduction in size of a projector. For example, in PTL 1 (Japanese Unexamined Patent Application Publication No. 2009-216843), a rotary-type deflecting optical component is provided in a portion of an illumination optical system, to vary an orientation of a light ray and vary a coherence state, thereby reducing speckle. In this method, a rotary-type deflecting optical component is newly added to a currently-available optical system, which leads to an increase in the size and cost of the projector.

In addition, in PTL 2 (Japanese Unexamined Patent Application Publication No. 2003-98476), a diffusion element is provided in front of a fly-eye lens in an illumination optical system, to reduce speckle by oscillating the diffusion element. In this case, likewise, an element intended to reduce speckle is added, which leads to an increase in the size and cost of a projector.

In PTL 3 (Japanese Unexamined Patent Application Publication (Translation of PCT Application) No. 2012-527646), first, an intermediary image is formed by a spatial optical modulator, and a diffusion oscillation element is provided at a position thereof thereby reducing speckle. This likewise leads to an increase in the size and cost of a projector.

In this manner, there has been an issue that it becomes necessary to add a new unit to perform speckle reduction, which also leads to an increase in the size and cost of a projector.

Accordingly, for a projector, it is desired to develop a technique that makes it possible to achieve speckle reduction while suppressing an increase in configuration size.

[1.1 Overview of Optical System in Projector]

FIG. 1 illustrates an overview of an optical system in a projector 100 according to a first embodiment of the present disclosure.

The projector 100 includes a light source section 30, an illumination optical system 40, a mirror array device 10, and a projection optical system 51.

The light source section 30 includes one or a plurality of light sources that emits light that is to be a source of illumination light. For example, the light source section 30 includes, as alight source, a plurality of laser light sources (LD: Laser Diode) 31. As the light source, however, a light source other than the laser light source such as an LED (Light Emitting Diode) may be used.

On the basis of the light from the light source section 30, the illumination optical system 40 generates illumination light with which the mirror array device 10 is to be irradiated. The illumination optical system 40 may include a homogenizing optical system that homogenizes a light distribution.

The mirror array device 10 is a spatial optical modulator that includes a plurality of mirrors 11 that illumination light is to enter (refer to FIG. 3 and so on to be described later). The mirror array device 10 is a spatial optical modulator that varies a tilt angle of each mirror 11 on the basis of an image signal. Yin to deflect the illumination light toward the projection optical system 51, and generates a projection image from the illumination light. The mirror array device 10 is a micro-mirror array device such as a DMD (Digital Micromirror Device) in Which a plurality of micro-mirrors (mirrors 11) each corresponding to a pixel is provided in an array (in a matrix).

The projection optical system 51 projects, onto a projection surface such as a screen 50, the projection image that is generated on the basis of the illumination light and outputted from the mirror array device 10.

It is to be noted that a display system of a projector that performs color display is roughly classified into a single-plate system that uses only one spatial optical modulator and a three-plate system that includes a spatial optical modulator for each of R (red), G (green), and B (blue). The projector 100 according to the present disclosure is, however, applicable to any of these systems.

For example, in a case of the single-plate system, full color display is performed by time-division system, using a single spatial optical modulator (mirror array device 10). In this case, the light source section 30 emits light rays having wavelengths of the respective colors of R, G, and B by time-division system. The mirror array device 10 is irradiated, by time division, with the illumination light rays of the respective colors via the illumination optical system 40.

In synchronization with timings at which the light rays in the respective colors are applied, the mirror array device 10 generates, by time division, projection images in the respective colors that correspond to the illumination light rays in the respective colors. The projection image in each color derived from red light, green light, or blue light is outputted toward the projection optical system 51. The projection optical system 51 projects the projection images in the respective colors, by time division, onto a projection surface such as the screen 50.

[1.2 Overview of Control System in Projector]

Figure 2:
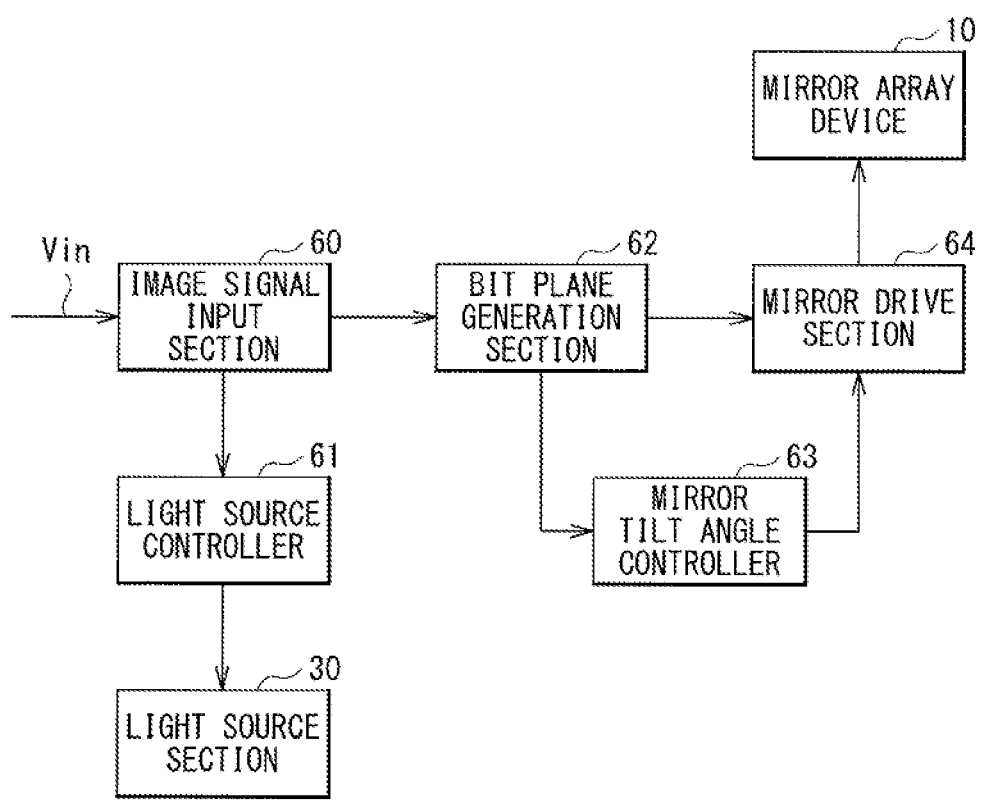
FIG. 2 is a block diagram that illustrates an overview of a control system in the projector according to the first embodiment.

FIG. 2 illustrates an overview of a control system in the projector 100.

The projector 100 includes an image signal input section 60, a light source controller 61, a bit plane generation section 62, a mirror tilt angle controller 63, and a mirror drive section 64.

The image signal input section 60 supplies the inputted image signal Vin to the bit plane generation section 62 and the light source controller 61.

On the basis of the image signal Vin, the light source controller 61 controls a light emission timing and light emission intensity of the light emitted by the light source section 30.

In the projector 100 according to the present embodiment, the mirror array device 10 is driven by a PWM (Pulse Width Modulation: pulse width modulation) system, to express gray-scale by the PWM system. In the projector 100, the mirror array device 10 expresses a display state of each pixel in two states of on/off (light-emitting (bright)/non-light emitting (dark)). For example, in the PWM system, gray-scale is expressed by maintaining a level of luminance of the light source at a constant level and varying a duration of light emission in accordance with the luminance. The mirror array device 10 performs modulation control to turn the light into the two bright and dark states for each pixel (for each mirror 11) in accordance with the luminance of an image intended for display. At this time, as the modulation control of light, the mirror array device 10 performs on (light-emitting)(non-light emitting) off control on the light in a pulse state.

On the basis of the image signal Vin, the bit plane generation section 62 generates, for each one-frame period, data for a plurality of bit planes each corresponding to one of a plurality of gray-scale bits that is displayed in each subframe period (refer to FIGS. 17 and 18 described later).

For example, it is possible to express a 16-gray-scale image within a predetermined period (usually, one frame) by combining at least four types of images each having different luminance. In other words, in a case of expressing 16 gray-scale, first, for example, luminance is quantized into four gray-scale bits for each pixel. Then, for example, image data for one frame is expressed through a combination of the four types of image data weighted by each gray-scale bit. At this time, a set of image data for each gray-scale bit is commonly referred to as a "bit plane". The bit plane is an information plane of luminance for each gray-scale bit.

Under the control by the mirror tilt angle controller 63, the mirror drive section 64 drives the mirror array device 10 on the basis of the data in each bit plane generated by the bit plane generation section 62.

The mirror tilt angle controller 63 controls the tilt angle of each mirror 11 in the mirror array device 10 that is described later. The mirror tilt angle controller 63 performs switching control on the tilt angle of each mirror 11 in a case of deflecting entering light toward the projection optical system 51 (in a case of turning the pixel into the bright state), to switch the tilt angle between a reference tilt angle θm1 that is described later and one or a plurality of non-reference tilt angles (non-reference tilt angles θm2 and θm3 that are described later) different from the reference tilt angle θm1. The mirror tilt angle controller 63 performs this switching control on the basis of the image signal Vin (data in the bit plane) within a predetermined period.

For example, the mirror tilt angle controller 63 periodically switches, within a predetermined period, the tilt angle of each mirror between the reference tilt angle θm1 and the non-reference tilt angle. Here, the predetermined period is a one-frame period that includes a plurality of subframe periods (refer to FIGS. 17 and 18 that are described later).

For example, the mirror tilt angle controller 63 switches, within a one-frame period, the tilt angle of each mirror 11 in synchronization with each subframe period, between the reference tilt angle θm1 and the non-reference tilt angle.

[1.3 Configuration Example of Mirror Array Device 10]

(Optical Characteristic of Mirror Array Device 10)

Figure 3:
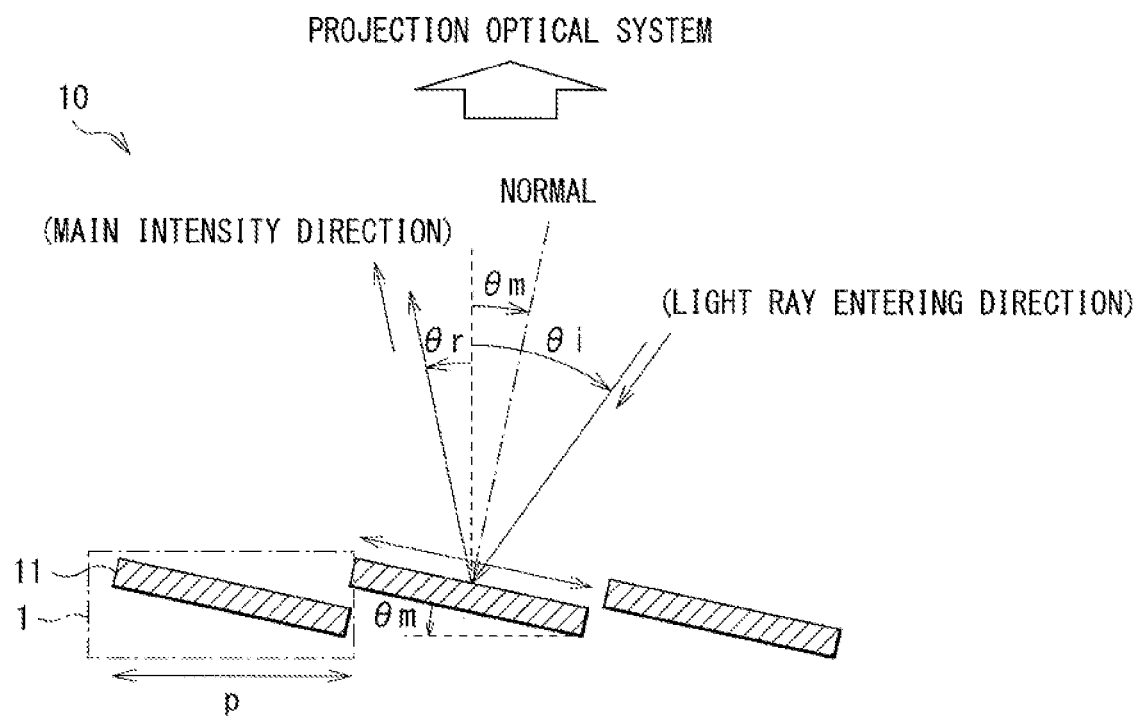
FIG. 3 is an explanatory diagram that illustrates an overview of a configuration and an optical characteristic of a mirror array device according to the first embodiment.

FIG. 3 illustrates an overview of a configuration and an optical characteristic of the mirror array device 10.

A diffraction position of light by the mirror array device 10 depends on a mirror pitch "p" of the mirror 11. Intensity of each diffracted ray of light depends on an angle of the mirror 11.

The optical characteristic of the mirror array device 10 is described one-dimensionally. As illustrated in FIG. 3, a cross-section of the mirror 11 in the mirror array device 10 has the same structure as a blazed diffraction grating. Here, for convenience of description, it is assumed that entering light is a parallel light ray having a single wavelength. Reflected light resulting from the entering light being reflected by the mirror 11 causes coherence. A direction of light in which the coherent light mutually intensifies follows the expression below, $$\theta = \text{Sin}^{-1}((m\lambda)/p - \text{Sin }\theta i),$$

$$m = 0, \pm 1, \pm 2, \ldots \qquad (1)$$

where

"λ" represents a wavelength of an entering light ray,
"p" represents a mirror pitch, and
"θi" represents an entering light ray angle.

When setting the tilt angle of the mirror 11 by a blaze angle, most of the intensity of the coherent light is concentrated in a specific direction. The angle thereof is as follows.

$$\theta r = 2\theta m - \theta i \qquad (2)$$

θm: the tilt angle of the mirror 11

Now, providing the mirror 11 at a tilt angle θm that is half an entering light ray angle θi, that is, 2θm=θi results in θ$_r$=0, which generates diffracted light having high intensity in a direction perpendicular to a plane in which the mirror 11 is provided. In the state, variation in the tilt angle θm of the mirror 11 causes a center of the intensity to shift in a direction that satisfies Expression (2). The direction of the diffracted light, however, follows Expression (1), and therefore, variation in the tilt angle θm of the mirror 11 results in variation in light intensity of each order in a diffraction direction in Expression (1). In a layout of an optical system in the projector 100, the projection optical system 51 is provided in the diffraction direction. Therefore, variation in the tilt angle θm of the mirror 11 results in variation in an intensity distribution of light that enters the projection optical system 51. A difference in the intensity distribution of light in an entrance pupil of the projection optical system 51 results in a difference in a speckle pattern of the projection image that is projected onto the screen 50 or the like. Accordingly, temporally varying this intensity distribution causes the speckle pattern to be varied with time and to be time-averaged by an observers eye, thereby reducing speckle.

(Tilt Angle of Mirror Array Device 10)

Figure 4:
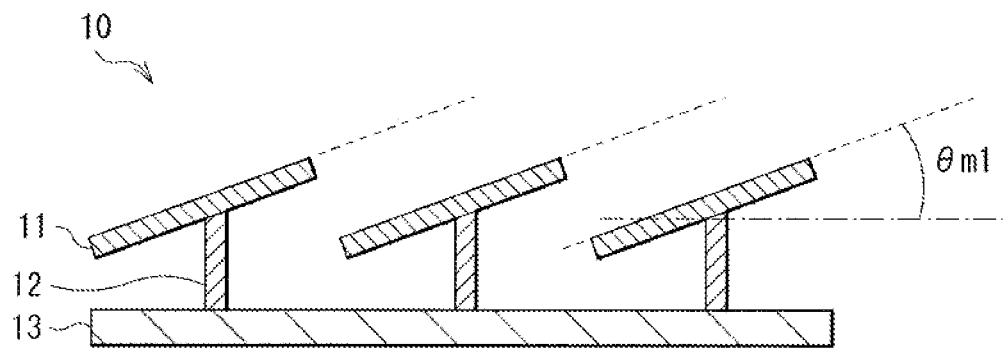
FIG. 4 is an explanatory diagram that illustrates a state in which a tilt angle of a mirror in the mirror array device is set to a reference tilt angle, and an example of a distribution state of light rays in an entrance pupil of a projection optical system in the state.
Figure 4:
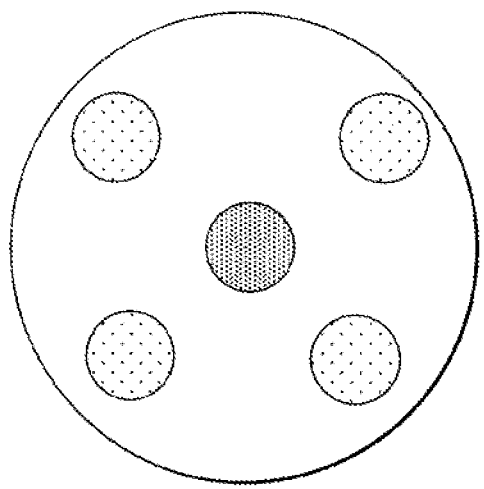

FIG. 4 illustrates a state in which the tilt angle θm of the mirror 11 in the mirror array device 10 is set to the reference tilt angle θm1 and an example of a distribution state of light rays in the entrance pupil of the projection optical system 51 in the state. It is to be noted that, in a diagram of the distribution state of the light ray in the entrance pupil illustrated in FIG. 4, a finer dotty pattern (dotted pattern) represents a state of a higher (brighter) light intensity. This similarly applies to the distribution state of the light rays in other subsequent drawings.

The mirror array device 10 includes a substrate 13 and a support 12 that supports each mirror 11 on the substrate 13 to allow for tilting of the mirror 11.

For example, it is assumed that the reference tilt angle θm1 is an angle that satisfies the foregoing Expression (1). In this case, as schematically illustrated in FIG. 4, the distribution state of the light rays in the entrance pupil of the projection optical system 51 is a state of a high (bright) light intensity near a center.

Figure 5:
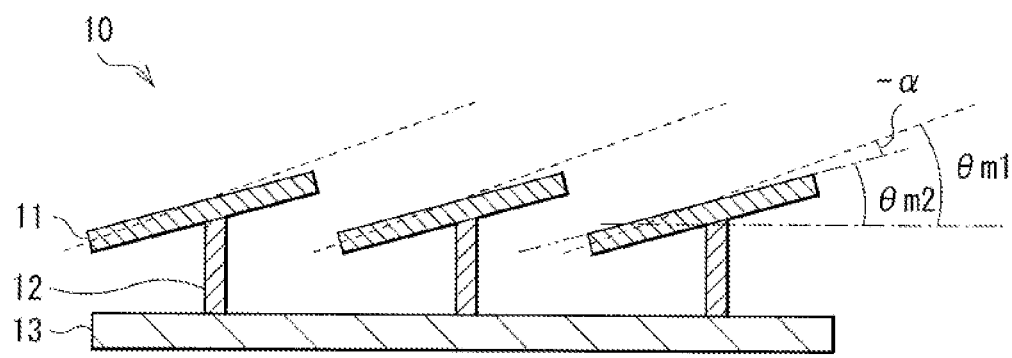
FIG. 5 is an explanatory diagram that illustrates a state in which the tilt angle of the mirror in the mirror array device is set to a non-reference tilt angle, and an example of a distribution state of light rays in the entrance pupil of the projection optical system in the state.
Figure 5:
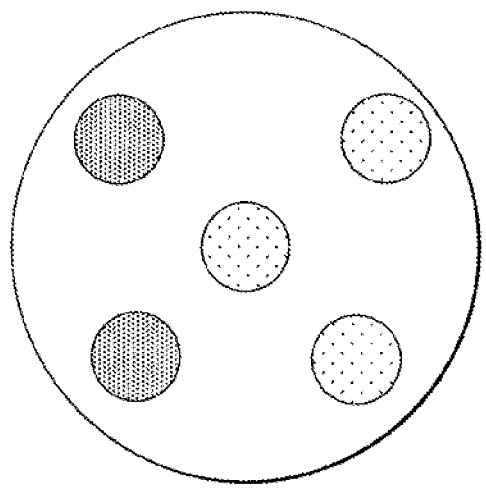

FIG. 5 illustrates a state in which the tilt angle θm of the mirror 11 in the mirror array device 10 is set to a non-reference tilt angle θm2 and an example of a distribution state of light rays in the entrance pupil of the projection optical system 51 in the state.

For example, it is assumed that the non-reference tilt angle θm2 is an angle different from the reference tilt angle θm1 by a small angle −α. In other words, it is assumed that θm2=(θm1−α). In this case, as schematically illustrated in FIG. 5, in the distribution state of light rays in the entrance pupil of the projection optical system 51, a region having a high (bright) light intensity is in a state of being shifted in a certain direction from near the center toward near a periphery.

Figure 6:
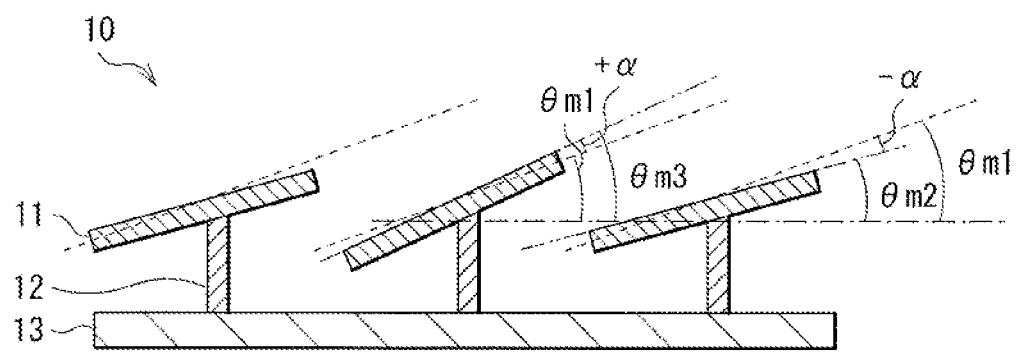
FIG. 6 is an explanatory diagram that illustrates an example of a state in which the tilt angle of the mirror in the mirror array device according to the first embodiment is set to a plurality of non-reference tilt angles.

FIG. 6 illustrates an example of a state in which the tilt angle θm of the mirror 11 in the mirror ray device 10 according to the first embodiment is set to a plurality of non-reference tilt angles.

In FIG. 5, the non-reference tilt angle θm2 may be assumed to be a first non-reference tilt angle, and the non-reference tilt angle may further include a second non-reference tilt angle θm3. The mirror tilt angle controller 63 may perform switching control on the tilt angle θm of each mirror 11 to cause the plurality of mirrors 11 to include, at the same time, the mirror 11 having the first non-reference tilt angle θm2 and the mirror 11 having the second non-reference tilt angle θm3. For example, switching control may be performed to cause a half of the plurality of mirrors 11 in the mirror array device 10 to have the first non-reference tilt angle θm2 while causing another half of the plurality of mirrors 11 to have the second non-reference tilt angle θm3 at the same time. It is to be noted that there may be three or more non-reference tilt angles.

For example, it is assumed that the second non-reference tilt angle θm3 is an angle different from the reference tilt angle θm1 by a small angle +α. In other words, it is assumed that θm2=(θm1+α).

Comparative Example

Figure 7:
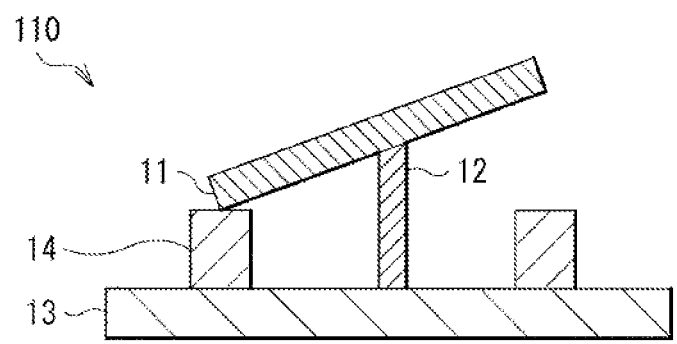
FIG. 7 is a cross-sectional diagram that illustrates an example of a structure of a mirror array device according to a comparative example.

FIG. 7 illustrates an example of a structure of a mirror array device 110 according to a comparative example.

The mirror array device 110 includes the substrate 13, the support 12 that supports each mirror 11 on the substrate 13, and a stopper 14 that limits the tilt angle θm of the mirror 11. The support 12 supports each mirror 11 to allow for tilting of each mirror 11 in accordance with a drive voltage applied to the mirror array device 110. For example, for one mirror 11, two stoppers 14 are provided symmetrically with respect to the support 12.

In the mirror array device 110 according to this comparative example, the tilt angle θm of the mirror 11 in a case of deflecting the entering light toward the projection optical system 51 (in a case of turning a pixel into the bright state) is limited only to one certain angle (reference tilt angle θm1) by one stopper 14. In contrast, in the mirror array device 10 according to the present embodiment, the structure illustrated in the following specific example makes it possible to vary the tilt angle θm to the reference tilt angle θm1 and to one or a plurality of non-reference tilt angles.

In the following, a specific example of the structure of the mirror ray device 10 is described. It is to be noted that, in the following specific example, the same reference numerals are assigned to approximately the same components as those in the mirror array device 110 according to the comparative example in FIG. 7, and descriptions thereof are omitted where appropriate.

First Specific Example

Figure 8:
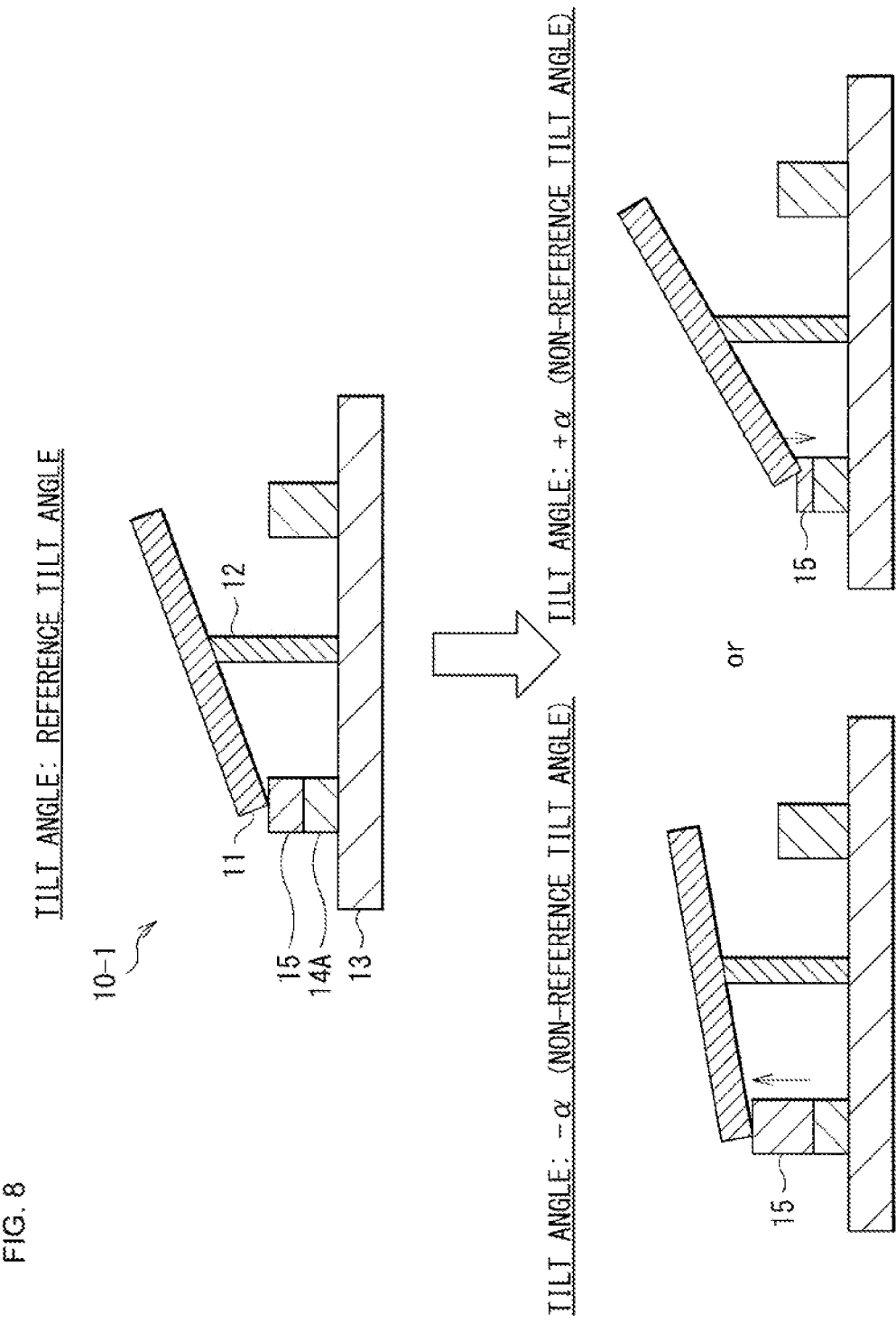
FIG. 8 is a cross-sectional diagram that illustrates a first specific example of a structure of the mirror array device according to the first embodiment.

FIG. 8 illustrates a structure of a mirror array device 10-1 according to a first specific example.

The mirror array device 10-1 according to the first specific example is different from the mirror array device 110 according to the comparative example in the structure of one stopper 14 out of the two stoppers 14. In the mirror array device 10-1; one stopper HA includes a stopper height adjuster with which a height of the stopper 14A is to be varied. For example, the stopper height adjuster is a piezoelectric element 15 such as an inverse piezoelectric element or a piezoelectric thin film. In the mirror array device 10-1, application of a voltage causes the piezoelectric element 15 to expand and contract, thereby causing variation in the height of the stopper 14A. As a result, the tilt angle θm of the mirror 11 is varied. For example, this makes it possible to vary the tilt angle θm of the mirror 11 from the reference tilt angle θm1 to the first non-reference tilt angle θm2 (=θm1−α) or the second non-reference tilt angle θm3(=m1+α).

Second Specific Example

Figure 9:
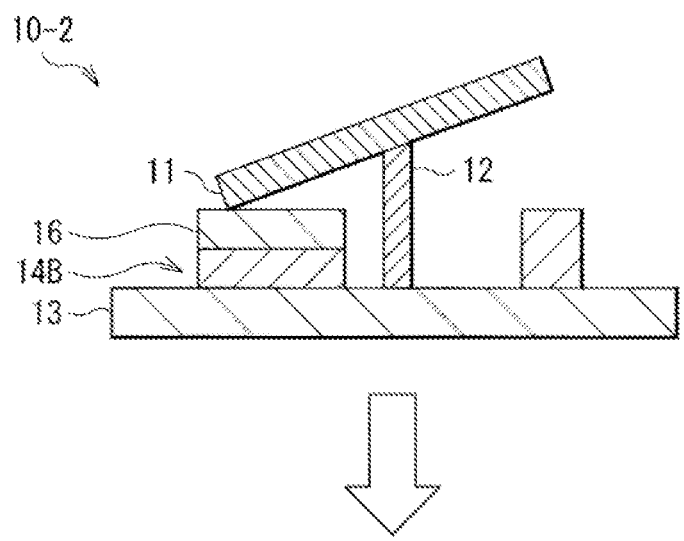
FIG. 9 is a cross-sectional diagram that illustrates a second specific example of the structure of the mirror array device according to the first embodiment.
Figure 9:
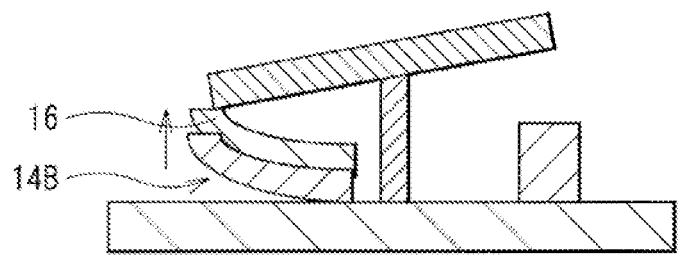

FIG. 9 illustrates a structure of a mirror array device 10-2 according to a second specific example.

The mirror array device 10-2 according to the first specific example is different from the mirror array device 110 according to the comparative example in a structure of one stopper 14 out of the two stoppers 14. In the mirror array device 10-2, one stopper 14B includes a stopper height adjuster with which a height of the stopper 14B is to be varied. For example, the stopper height adjuster is a piezoelectric element 16 such as an inverse piezoelectric element or a piezoelectric thin film. In the mirror array device 10-2, application of a voltage causes the piezoelectric element 16 to deform to be warped. This varies the height of the stopper 14B. As a result, the tilt angle θm of the mirror 11 is varied. For example, this makes it possible to vary the tilt angle θm of the mirror 11 from the reference tilt angle θm1 to the first non-reference tilt angle θm2(=θm1−α) or the second non-reference tilt angle θm3(=m1+α).

In a case of using, as the mirror array device 10, the mirror array device 10-3 according to the foregoing third specific example, the mirror tilt angle controller 63 performs, by controlling the support height adjuster, switching control on the tilt angle θm of each mirror 11 to switch the tilt angle θm between the reference tilt angle θm1 and the non-reference tilt angle (θm2 and the like).

Third Specific Example

Figure 10:
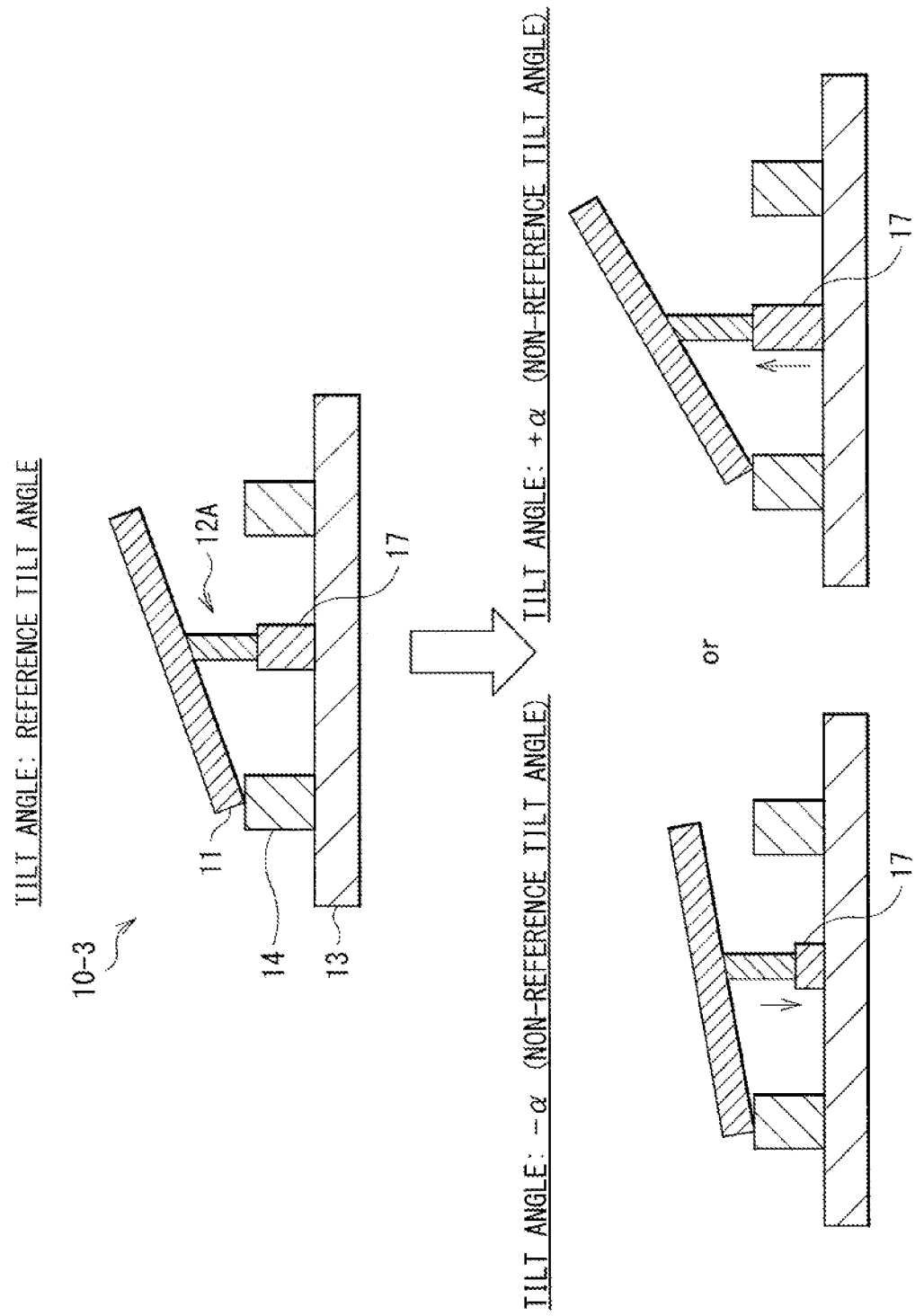
FIG. 10 is a cross-sectional diagram that illustrates a third specific example of the structure of the mirror array device according to the first embodiment.

FIG. 10 illustrates a structure of a mirror array device 10-3 according to a third specific example.

The mirror array device 10-3 according to the first specific example is different from the mirror array device 110 according to the comparative example in a structure of the support 12. In the mirror array device 10-3, a support 12A includes a support height adjuster with which a height of the support 12A is to be varied. For example, the support height adjuster is a piezoelectric element 17 such as an inverse piezoelectric element or a piezoelectric thin film. In the mirror array device 10-3, application of a voltage causes the piezoelectric element 17 to expand and contract, thereby causing variation in the height of the support 12A. As a result, a height of the mirror 11 with respect to the stopper 14 is relatively varied, thereby causing variation in the tilt angle θm of the mirror 11. For example, this makes it possible to vary the tilt angle θm of the mirror 11 from the reference tilt angle θm1 to the first non-reference tilt angle θm2 (=m1−α) or the second non-reference tilt angle θm3 (=θm1+α).

In a case of using, as the mirror array device 10, the mirror army device 10-3 according to the foregoing third specific example, the mirror tilt angle controller 63 performs, by controlling the support height adjuster, switching control on the tilt angle θm of each mirror 11 to switch the tilt angle θm between the reference tilt angle θm1 and the non-reference tilt angle (θm2 and the like).

Fourth Specific Example

Figure 11:
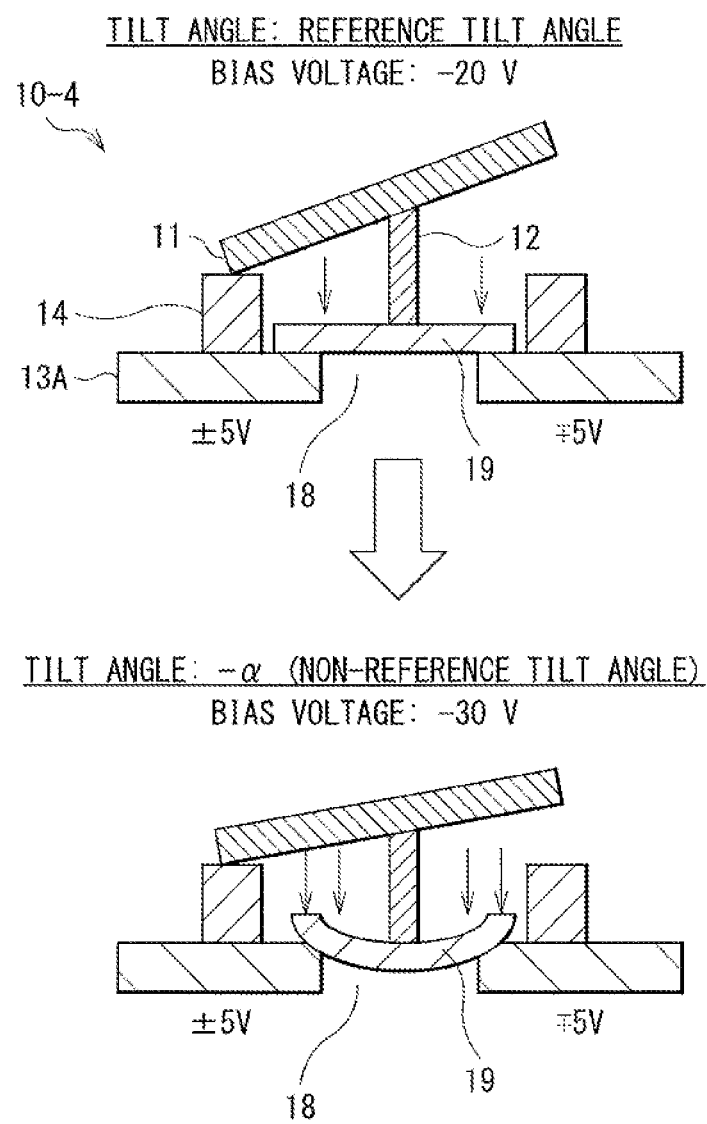
FIG. 11 is a cross-sectional diagram that illustrates a fourth specific example of the structure of the mirror array device according to the first embodiment.

FIG. 11 illustrates a structure of a mirror array device 10-4 according to a fourth specific example.

The mirror array device 10-4 according to the fourth specific example is different from the mirror array device 110 according to the comparative example in a structure at a bottom of the support 12.

In the mirror array device 10-4, the support 12 includes a first end (top) and a second end (bottom). The support 12 supports the mirror 11 at the first end.

The mirror array device 10-4 includes a beam 19. The beam 19 includes a first surface (upper surface) and a second surface (lower surface) that are opposed to each other. The second end of the support 12 is coupled to the first surface of the beam 19. A portion of the second surface of the beam 19 is spatially opened as a result of provision of a cavity (space) 18 in the substrate 13A. The beam 19 thereby has a configuration deformable toward the cavity 18 side.

The mirror array device 104 has a configuration that the mirror 11 tilts in accordance with an applied drive voltage. Applied to the mirror 11 as the drive voltage is a bias voltage (for example, −20 V and −30 V) that differs between a case of setting to the reference tilt angle θm1 and a case of setting to the non-reference tilt angle (for example, θm2). To vicinities of the two stoppers 14, variable drive voltages having polarities opposite to each other (for example, a drive voltage of 5 V that is alternately varied between and + and −) are applied. In accordance with a voltage difference between the bias voltage applied to the mirror 11 and the drive voltages applied to the vicinities of the two stoppers 14, the mirror 11 tilts to be attracted into a direction of one of the two stoppers 14. In this case, as the voltage difference between the mirror 11 and the vicinities of the stoppers 14 becomes larger, a force that attracts the mirror 11 becomes larger and gives a larger downward pressure to the beam 19, thereby causing a portion of the beam 19 to deform to sink on the cavity 18 side. As a result, the height of the mirror 11 with respect to the stopper 14 is relatively varied, thereby causing variation in the tilt angle θm of the mirror 11.

In a case of using, as the mirror array device 10, the mirror array device 10-4 according to the foregoing fourth specific example, the mirror tilt angle controller 63 controls the bias voltage that is applied to the mirror 11, thereby making it possible to perform switching control on the tilt angle θm of each mirror 11 to switch the tilt angle θm between the reference tilt angle θm1 and the non-reference tilt angle (θm2 and the like).

Fifth Specific Example

Figure 12:
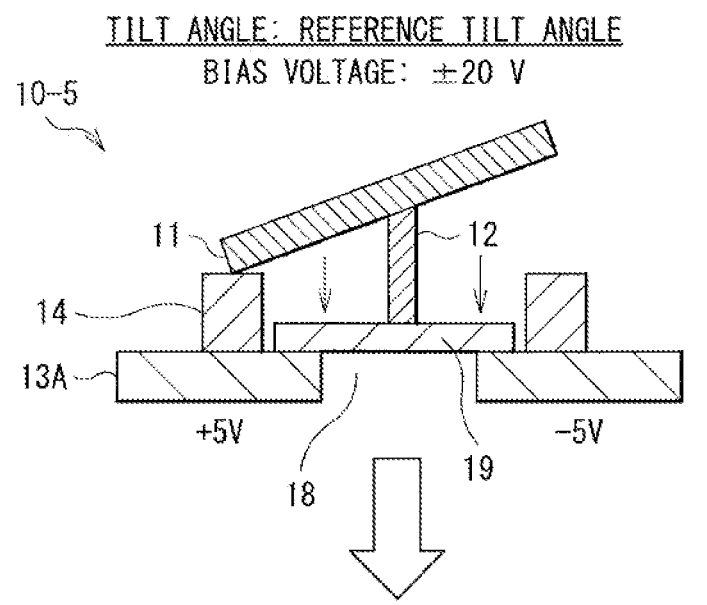
FIG. 12 is a cross-sectional diagram that illustrates a fifth specific example of the structure of the mirror array device according to the first embodiment.
Figure 12:
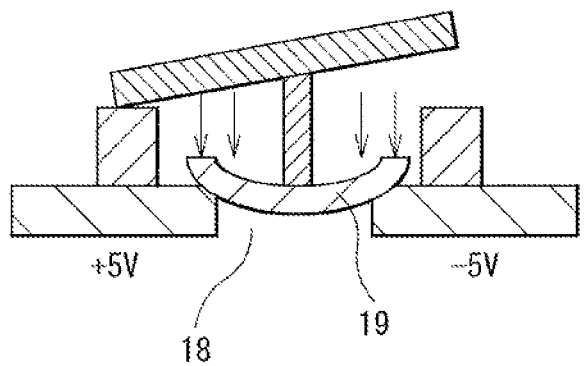

FIG. 12 illustrates a structure of a mirror array device 10-5 according to a fifth specific example.

The mirror array device 10-5 has a structure similar to that of the mirror array device 10-4 according to the fourth specific example, but is different in a method of applying the drive voltage. In the mirror array device 10-5, applied to the mirror 11 as the drive voltage is a bias voltage (for example, ±20 V and ±30 V) that differs between a case of setting to the reference tilt angle θm1 and a case of setting to the non-reference tilt angle (for example, θm2). To vicinities of the respective two stoppers 14, fixed drive voltages having polarities opposite to each other (for example, +5 V and −5 V) are applied. In accordance with a voltage difference between the bias voltage applied to the mirror 11 and the drive voltages applied to the vicinities of the respective two stoppers 14, the mirror 11 tilts to be attracted into a direction of one of the two stoppers 14. In this case, as the voltage difference between the mirror 11 and the vicinities of the stoppers 14 becomes larger, a force that attracts the mirror 11 becomes larger and gives a larger downward pressure to the beam 19, thereby causing a portion of the beam 19 to deform to sink on the cavity 18 side. As a result, the height of the mirror 11 with respect to the stopper 14 is relatively varied, thereby causing variation in the tilt angle θm of the mirror 11.

In a case of using, as the mirror array device 10, the mirror array device 10-5 according to the foregoing fifth specific example, the mirror tilt angle controller 63 performs switching control on the bias voltage applied to the mirror 11, thereby making it possible to perform switching control on the tilt angle θm of each mirror 11 to switch the tilt angle θm between the reference tilt angle θm1 and the non-reference tilt angle (θm2 and the like).

[1.4 Description of Tilt Angle of Mirror and Light-Ray-Capturing Angle of Projection Optical System 51]

Figure 13:
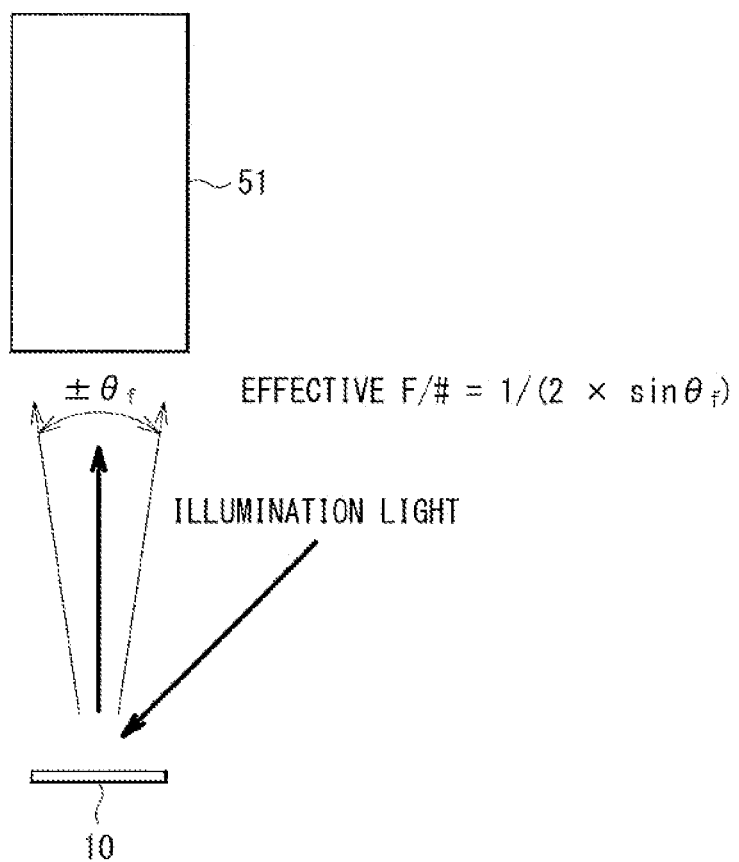
FIG. 13 is an explanatory diagram of a light-ray-capturing angle of a projection optical system.

FIG. 13 is an explanatory diagram of a light-ray-capturing angle of the projection optical system 51.

Usually, an angle range of a light ray capturable by a projection lens (projection optical system 51) is defined by an effective F-number (effective F/#). When assuming the angle (half angle) to be $\theta_f$, there is a relationship as follows.

$$F/\# = 1/(2 \times \sin \theta_f)$$

Therefore, light coming from the mirror array device 10 that is provided within an angle range of $\pm \theta_f$ is to be transmitted through the projection optical system 51.

Figure 14:
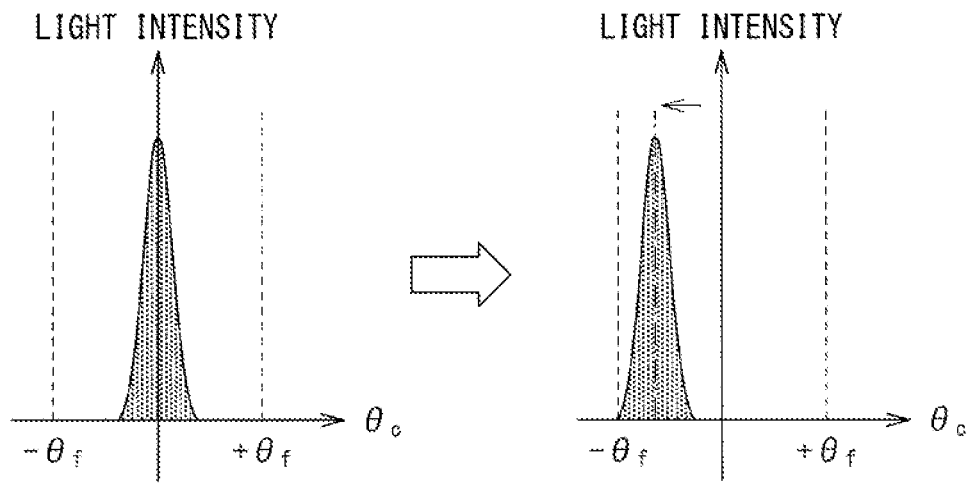
FIG. 14 is an explanatory diagram that illustrates a first example of a relationship between the tilt angle of the mirror in the mirror array device and an intensity distribution of light entering the projection optical system.

FIG. 14 illustrates a first example of a relationship between the tilt angle θm of the mirror 11 in the mirror array device 10 and an intensity distribution of light entering the projection optical system 51. FIG. 14 illustrates an example of a case where the illumination light toward the mirror array device 10 is similar to parallel light such as laser light.

Figure 15:
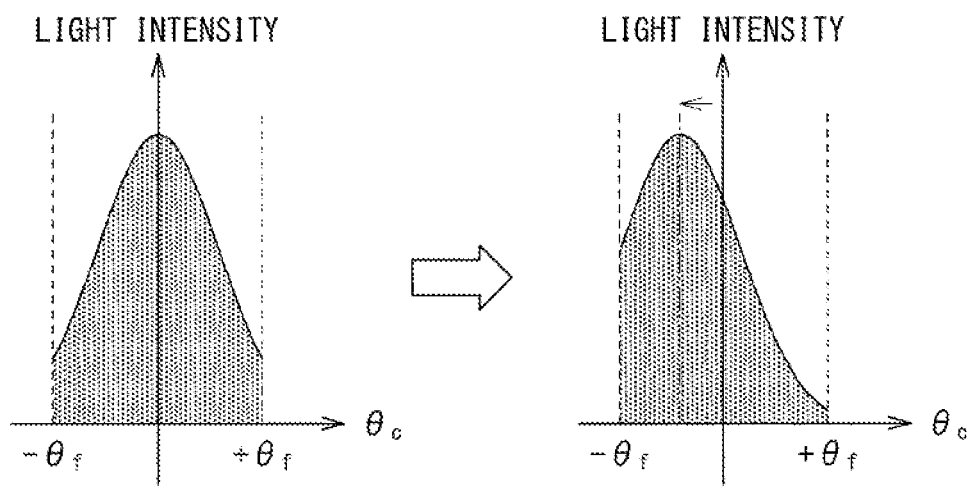
FIG. 15 is an explanatory diagram that illustrates a second example of the relationship between the tilt angle of the mirror in the mirror array device and the intensity distribution of the light entering the projection optical system.

FIG. 15 illustrates a second example of a relationship between the tilt angle θm of the mirror 11 in the mirror array device 10 and an intensity distribution of light entering the projection optical system 51. FIG. 15 illustrates an example of a case where the illumination light toward the mirror array device 10 has a certain angle range as with lamp light or the like.

When assuming a small tilt angle (the above-described −α and +α) from a defined angle (reference tilt angle θm1) of the mirror 11 to be θc, the relationship with the distribution of the light entering the projection optical system 51 is as illustrated in a diagram on left side in each of FIGS. 14 and 15.

As illustrated in FIG. 14, in a case where the illumination light toward the mirror array device 10 is similar to parallel light, there is an allowance with respect to θr, therefore making it possible to increase a small tilt angle θc (where θc<θr). Whereas, as illustrated in FIG. 15, in a case where the illumination light toward the mirror array device 10 has a certain angle range, great variation in the small tilt angle θc results in a decrease in an amount of light transmitted through the projection optical system 51. Therefore, it is necessary to suppress the small tilt angle θc appropriately. As a guideline, the small tilt angle θc is to be suppressed to a degree that prevents variation in the amount of light from having an influence on image quality (such as flicker). In addition, as a method of reducing it, it is also possible to suppress the variation in the amount of light by tilting a portion of the mirrors 11 into a + direction and a remaining portion of the mirrors 11 into a − direction, thereby making it possible to enhance a speckle reduction effect.

[1.5 Distribution State of Light Ray for Each Wavelength]

FIG. 1_6 illustrates a state in which the tilt angle θm of the mirror 11 in the mirror array device 10 is set to the non-reference tilt angle θm2 and an example of a distribution state of light rays for each wavelength in the entrance pupil of the projection optical system 51.

As described above, for example, in a case of the single-plate system, full color display is performed by time-division system, using a single spatial optical modulator (mirror array device 10). In this case, the mirror array device 10 is irradiated with illumination light rays in the respective colors of R, G, and B by time division.

Figure 16:
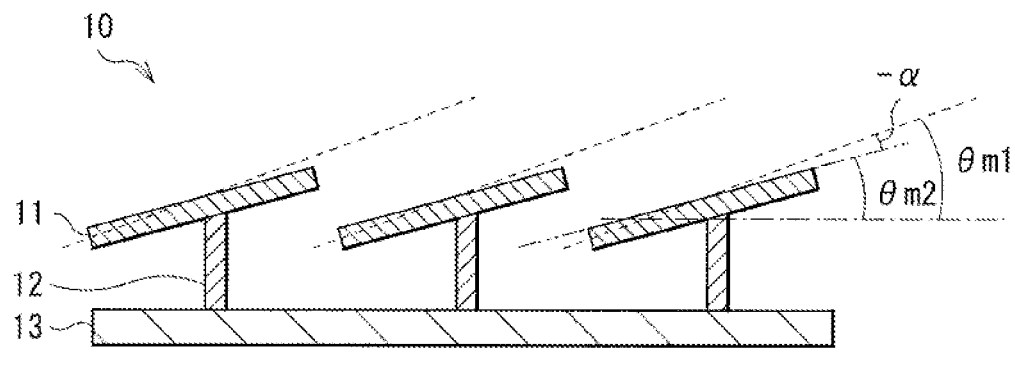
FIG. 16 is an explanatory diagram that illustrates a state in which the tilt angle of the mirror in the mirror array device is set to the non-reference tilt angle and an example of the distribution state of the light rays for each wavelength in the entrance pupil of the projection optical system in the state.
Figure 16:
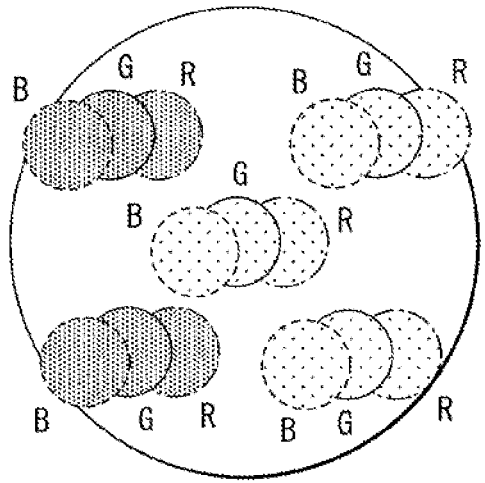

As described above, the diffraction position of light by the mirror array device 10 depends on the mirror pitch "p" of the mirror 11. The intensity of each diffracted ray of light depends on the angle of the mirror 11. FIG. 16 schematically illustrates an example of a case of shifting, by the same angle irrespective of the color, the tilt angle θm of the mirror 11 from the reference tilt angle θm1 to the non-reference tilt angle θm2. In a case where each mirror 11 has the same tilt angle θm, the amount of variation in the intensity distribution of light differs depending on the wavelength. Therefore, in consideration of the influence of the wavelength, it is preferable to shift the tilt angle θm of each mirror 11 by a different angle for each color.

[1.6 Example of Gray-Scale Bit Configuration in One Frame]

For example, the mirror tilt angle controller 63 periodically switches, within a predetermined period, the tilt angle θm of each mirror 11 between the reference tilt angle θm1 and the non-reference tilt angle (θm2 and the like). Here, the predetermined period may be a one-frame period that includes a plurality of subframe periods. For example, the mirror tilt angle controller 63 switches, within a one-frame period, the tilt angle θm of each mirror 11, in synchronization with each subframe period, between the reference tilt angle θm1 and the non-reference tilt angle (θm2 and the like). In the following, a specific example is described.

Figure 17:
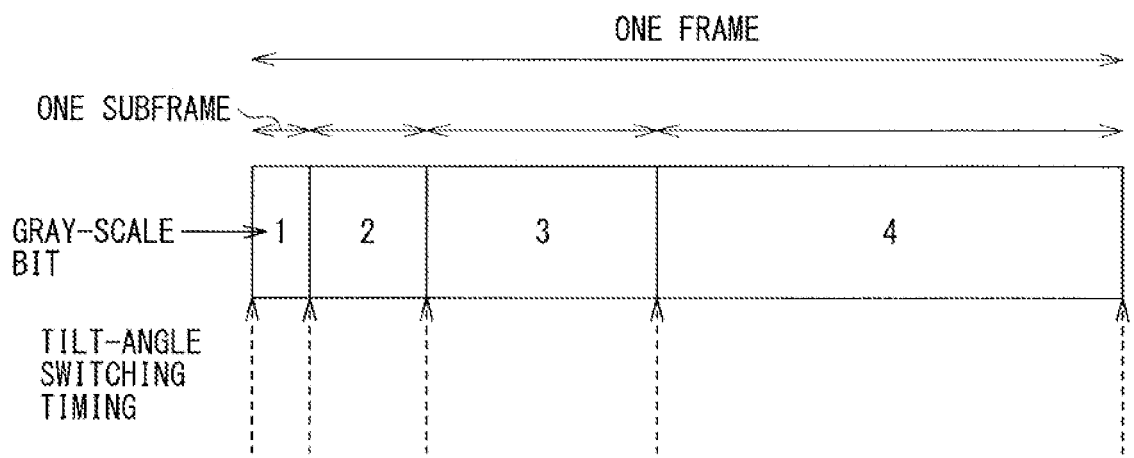
FIG. 17 is an explanatory diagram that illustrates a first example of a gray-scale bit configuration in one frame.
Figure 18:
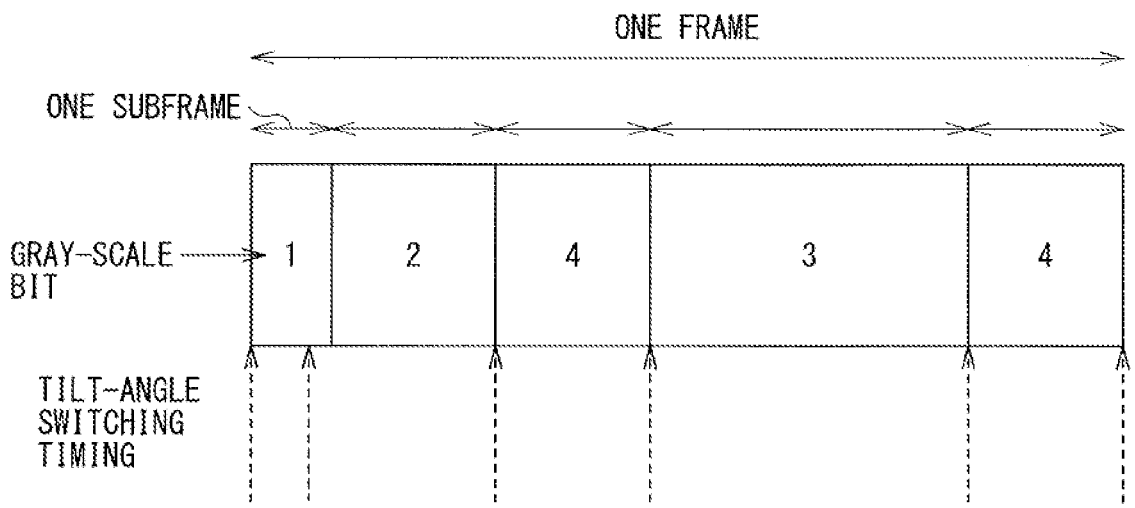
FIG. 18 is an explanatory diagram that illustrates a second example of the gray-scale bit configuration in one frame.

FIG. 17 illustrates a first example of a gray-scale bit configuration in one frame. FIG. 18 illustrates a second example of a gray-scale bit configuration in one frame.

As described above, for example, it is possible to express, within a predetermined period (usually, one frame), a 16-gray-scale image by combining at least four types of images each having different luminance. In this case, for example, as illustrated in FIG. 17, one frame is divided into a plurality of subframes according to the gray-scale bits, and each subframe is assigned with a corresponding one of the gray-scale bits to perform display.

Within a one-frame period, at a timing of switching a display period of each gray-scale bit (timing of switching subframes), a tilting state (the light-emitting (bright)/non-light emitting (dark) state) of each mirror 11 in the mirror array device 10 is varied. Performing, at this timing, switching control on the tilt angle θm of each mirror 11 to switch the tilt angle θm between the reference tilt angle θm1 and the non-reference tilt angle (θm2 and the like) also makes it easier to build a control algorithm.

Meanwhile, to reduce a false contour, etc., a gray-scale bit portion having a long display time is divided to perform display in some cases. FIG. 18 is an example in which a period "4" of gray-scale bits is divided into two to perform display. Also in such a case, it is preferable to perform, in synchronization with a timing of switching each gray-scale bit, switching control on the tilt angle θm of each mirror 11 to switch the tilt angle θm between the reference tilt angle θm1 and the non-reference tilt angle (θm2 and the like).

[1.7 Effects]

As described above, according to the present embodiment, switching control is performed, on the basis of the image signal Vin within a predetermined period, on the tilt angle θm of each mirror 11 in a case of deflecting the entering light toward the projection optical system 51 to switch the tilt angle θm between the reference tilt angle θm1 and one or a plurality of non-reference tilt angles (θm2 and the like) different from the reference tilt angle θm1. This makes it possible to achieve speckle reduction while suppressing an increase in configuration size.

According to the present embodiment, driving the mirror array device 10 while varying, the tilt angle θm of the mirror 11 into a plurality of angles makes it possible to temporally vary a distribution of light amount within the entrance pupil of the projection optical system 51. According to the present embodiment, temporally varying the speckle pattern makes it possible to produce the speckle reduction effect by time average effect. According to the present embodiment, without adding a new unit that performs speckle reduction, it is possible to obtain the speckle reduction effect. This makes it unnecessary to provide a speckle reduction mechanism, thereby making it possible to achieve size reduction, cost reduction, etc.

It is to be noted that effects described herein are merely illustrative and are not limitative, and other effects may be provided.

2. Other Embodiments

The technology according to the present disclosure is not limited to the description of the foregoing embodiments, and may be modified in a variety of ways.

For example, the present technology may have the following configurations.

(1)
A projector, including:
a light source section that emits light that is to be a source of illumination light;
a projection optical system that projects a projection image onto a projection surface, the projection image being generated on the basis of the illumination light;
a mirror array device that includes a plurality of mirrors that the illumination light is to enter, the mirror array device varying a tilt angle of each of the mirrors on the basis of an image signal to deflect the illumination light toward the projection optical system, and generating the projection image from the illumination light; and
a tilt angle controller that performs switching control, on the basis of the image signal within a predetermined period, on the tilt angle of each of the mirrors in a case of deflecting the entering light toward the projection optical system, the switching control being control of switching the tilt angle between a reference tilt angle and one or a plurality of non-reference tilt angles different from the reference tilt angle.

(2)
The projector according to (1) described above, in which the tilt angle controller periodically switches the tilt angle of each of the mirrors between the reference tilt angle and the one or the plurality of non-reference tilt angles within the predetermined period.

(3)
The projector according to (2) described above, in which the predetermined period is a one-frame period that includes a plurality of subframe periods, and
the tilt angle controller switches, within the one-frame period, the tilt angle of each of the mirrors between the reference tilt angle and the one or the plurality of the non-reference tilt angles in synchronization with a corresponding one of the subframe periods.

(4)
The projector according to (3) described above, further including a bit plane generation section that generates, for each one-frame period data for a plurality of bit planes on the basis of the image signal, the plurality of bit planes each corresponding to one of a plurality of gray-scale bits, the data being displayed in each of the subframe periods.

(5)
The projector according to any one of (1) to (4) described above, in which
the plurality of non-reference tilt angles includes a first non-reference tilt angle and a second non-reference tilt angle, and
the tilt angle controller performs the switching control on the tilt angle of each of the mirrors to cause the plurality of mirrors to include, at a same time, a mixture of a mirror having the first non-reference tilt angle and a mirror having the second non-reference tilt angle.

(6)
The projector according to any one of (1) to (5) described above, in which the mirror array device further includes a stopper that limits the tilt angle of each of the mirrors,
the stopper includes a stopper height adjuster with which a height of the stopper is varied, and
the tilt angle controller controls the stopper height adjuster to perform switching control on the tilt angle of each of the mirrors to switch the tilt angle between the reference tilt angle and the one or the plurality of non-reference tilt angles.

(7)
The projector according to any one of (1) to (5) described above, in which
the mirror array device further includes a support that supports each of the mirrors, the support includes a support height adjuster with which a height of the support is varied, and
the tilt angle controller controls the support height adjuster to perform the switching control, on the tilt angle of each of the mirrors, of switching the tilt angle between the reference tilt angle and the one or the plurality of non-reference tilt angles.

(8)
The projector according to any one of (1) to (5) described above, in which
the mirror array device is configured to cause each of the mirrors to tilt in accordance with an applied drive voltage, and
the tilt angle controller controls the drive voltage to perform the switching control, on the tilt angle of each of the mirrors, of switching the tilt angle between the reference tilt angle and the one or the plurality of non-reference tilt angles.

(9)
The projector according to (8) described above, in which the mirror array device further includes
a support that includes a first end and a second end, the support supporting each of the mirrors at the first end, and
a beam that includes a first surface and a second surface that are opposed to each other, the first surface being coupled to the second end of the support, the second surface having a portion that is spatially opened and deforming in accordance with the drive voltage.

The present application claims the priority on the basis of Japanese Patent Application No. 2017-214114 filed on Nov. 6, 2017 with Japan Patent Office, the entire contents of which are incorporated in the present application by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. A projector, comprising:
a light source section that emits light that is to be a source of illumination light;
a projection optical system that projects a projection image onto a projection surface, the projection image being generated based on the illumination light;

a mirror array device that includes a plurality of mirrors that the illumination light is to enter, the mirror array device varying a tilt angle of each of the mirrors on a basis of an image signal to deflect the illumination light toward the projection optical system, and generating the projection image from the illumination light; and a tilt angle controller that performs switching control based on the image signal within a predetermined period and on the tilt angle of each of the mirrors in a case of deflecting the entering light toward the projection optical system, the switching control being in control of switching the tilt angle between a reference tilt angle and one or a plurality of non-reference tilt angles different from the reference tilt angle, wherein the predetermined period is a one frame period that includes a plurality of subframe periods, and wherein the mirror array device further includes:
a support that includes a first end and a second end, the support supporting each of the mirrors at the first end, and
a beam that includes a first surface and a second surface that are opposed to each other, the first surface being coupled to the second end of the support, and the second surface having first and second end portions coupled to a substrate and a central portion opposed to an opening,
wherein the central portion of the beam deforms towards the opening in accordance with a drive voltage.

2. The projector according to claim 1, wherein the tilt angle controller periodically switches the tilt angle of each of the mirrors between the reference tilt angle and the one or the plurality of non-reference tilt angles within the predetermined period.

3. The projector according to claim 1, wherein the tilt angle controller switches, within the one-frame period, the tilt angle of each of the mirrors between the reference tilt angle and the one or the plurality of the non-reference tilt angles in synchronization with a corresponding one of the subframe periods.

4. The projector according to claim 1, further comprising a bit plane generation section that generates, for each one-frame period, data for a plurality of bit planes based on the image signal, the plurality of bit planes each corresponding to one of a plurality of gray-scale bits, the data being displayed in each of the subframe periods.

5. The projector according to claim 1, wherein
the plurality of non-reference tilt angles includes a first non-reference tilt angle and a second non-reference tilt angle, and
the tilt angle controller performs the switching control on the tilt angle of each of the mirrors to cause the plurality of mirrors to include, at a same time, a mixture of a mirror having the first non-reference tilt angle and a mirror having the second non-reference tilt angle.

6. The projector according to claim 1, wherein
the mirror array device is configured to cause each of the mirrors to tilt in accordance with the drive voltage, and
the tilt angle controller controls the drive voltage to perform the switching control on the tilt angle of each of the mirrors, by switching the tilt angle between the reference tilt angle and the one or the plurality of non-reference tilt angles.

7. A projector, comprising:
a light source section that emits light that is to be a source of illumination light;

a projection optical system that projects a projection image onto a projection surface, the projection image being generated based on the illumination light;

a mirror array device that includes a plurality of mirrors that the illumination light is to enter, the mirror array device varying a tilt angle of each of the mirrors on a basis of an image signal to deflect the illumination light toward the projection optical system, and generating the projection image from the illumination light; and a tilt angle controller that performs switching control based on the image signal within a predetermined period and on the tilt angle of each of the mirrors in a case of deflecting the entering light toward the projection optical system, the switching control being in control of switching the tilt angle between a reference tilt angle and one or a plurality of non-reference tilt angles different from the reference tilt angle, wherein the predetermined period is a one frame period that includes a plurality of subframe periods, wherein each of the mirrors includes a first stopper at one end of the mirror and a second stopper at another end of the mirror with each stopper limiting the tilt angle of each of the mirrors, and wherein one of the either the first stopper or the second stopper includes a stopper height adjuster with which a height of either the first stopper or the second stopper is varied with respect to the height of the other of the first stopper or the second stopper.

8. The projector according to claim 7, wherein the tilt angle controller controls the stopper height adjuster to perform switching control on the tilt angle of each of the mirrors to switch the tilt angle between the reference tilt angle and the one or the plurality of non-reference tilt angles.

9. The projector according to claim 7, wherein the tilt angle controller periodically switches the tilt angle of each of the mirrors between the reference tilt angle and the one or the plurality of non-reference tilt angles within the predetermined period.

10. The projector according to claim 7, wherein the stopper height adjuster includes a piezoelectric element.

11. The projector according to claim 10, wherein the piezoelectric element includes an inverse piezoelectric element or a piezoelectric thin film.

12. The projector according to claim 7, further comprising a bit plane generation section that generates, for each one-frame period, data for a plurality of bit planes based on the image signal, the plurality of bit planes each corresponding to one of a plurality of gray-scale bits, the data being displayed in each of the subframe periods.

13. The projector according to claim 7, wherein the mirror array device is configured to cause each of the mirrors to tilt in accordance with an applied drive voltage.

14. A projector, comprising:
a light source section that emits light that is to be a source of illumination light;
a projection optical system that projects a projection image onto a projection surface, the projection image being generated on a basis of the illumination light;
a mirror array device that includes a plurality of mirrors that the illumination light is to enter, the mirror array device varying a tilt angle of each of the mirrors based on an image signal to deflect the illumination light toward the projection optical system, and generating the projection image from the illumination light; and
a tilt angle controller that performs switching control based on the image signal within a predetermined period and on the tilt angle of each of the mirrors in a case of deflecting the entering light toward the projection optical system, the switching control being in control of switching the tilt angle between a reference tilt angle and one or a plurality of non-reference tilt angles different from the reference tilt angle, wherein the predetermined period is a one frame period that includes a plurality of subframe periods, and wherein the mirror array device further includes:

a support that includes a first end and a second end, the support supporting each of the mirrors at the first end, and a support height adjuster that includes a first side and a second side that are opposed to each other, the first side being coupled to the second end of the support and the second side being coupled to a substrate, wherein a height of the support height adjuster is varied.

15. The projector according to claim 14, wherein the tilt angle controller controls the support height adjuster to perform the switching control on the tilt angle of each of the mirrors, by switching the tilt angle between the reference tilt angle and the one or the plurality of non-reference tilt angles.

16. The projector according to claim 14, wherein the tilt angle controller periodically switches the tilt angle of each of the mirrors between the reference tilt angle and the one or the plurality of non-reference tilt angles within the predetermined period.

17. The projector according to claim 14, wherein the support height adjuster includes a piezoelectric element.

18. The projector according to claim 17, wherein the piezoelectric element includes an inverse piezoelectric element or a piezoelectric thin film.

19. The projector according to claim 14, further comprising a bit plane generation section that generates, for each one-frame period, data for a plurality of bit planes based on the image signal, the plurality of bit planes each corresponding to one of a plurality of gray-scale bits, and the data being displayed in each of the subframe periods.

* * * * *